(No Model.)

J. MAGUIRE.
DRAIN TILE TRAP.

No. 360,602. Patented Apr. 5, 1887.

Witnesses.

Inventor.
John Maguire

UNITED STATES PATENT OFFICE.

JOHN MAGUIRE, OF TORONTO, ONTARIO, CANADA, ASSIGNOR OF ONE HALF TO ROBERT CARROLL, OF SAME PLACE.

DRAIN-TILE TRAP.

SPECIFICATION forming part of Letters Patent No. 360,602, dated April 5, 1887.

Application filed January 3, 1887. Serial No. 223,174. (No model.)

*To all whom it may concern:*

Be it known that I, JOHN MAGUIRE, of the city of Toronto, in the county of York, in the Province of Ontario, Canada, drain inspector, have invented certain new and useful Improvements in Drain-Tile Traps, of which the following is a specification.

This invention relates to drain-tile traps of that class in which the outlet is below the level of the inlet; and it consists in the peculiar combinations and the novel construction, arrangement, and adaptation of parts, all as more fully hereinafter described and claimed.

Figure 1:
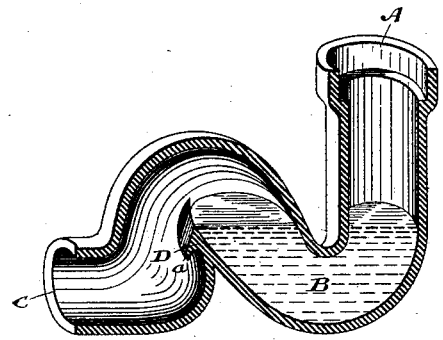
Figure 2:
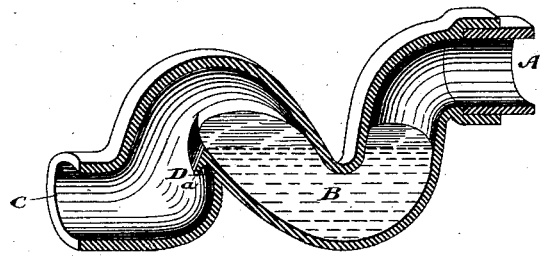
Figure 3:
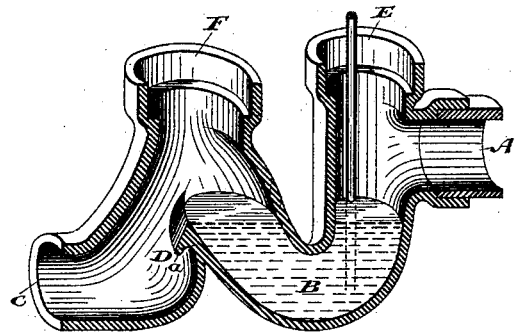

Figure 1 is a perspective sectional view of a P or down pipe trap. Fig. 2 is a perspective sectional view of a running trap constructed in accordance with my invention. Fig. 3 is a perspective sectional view of a hand-hole and ventilating-trap constructed in accordance with my invention.

In the drawings like letters of reference indicate corresponding parts in each figure.

A represents the inlet to the trap B, and C is the outlet which leads to the sewer. It will be noticed that the level of the seal in the trap B is slightly below the bottom of the inlet A, while it is slightly above the top of the outlet C, the top of the seal-protector D being the point which determines the level of the seal.

It will be noticed that a lip or flange, *a*, projects from the seal-protector D toward the outlet C, and is curved so that the water and material passing through the trap B will readily flow over it into the outlet C.

Owing to the fact that the outlet C is below the inlet A and that the seal-protector D is located and formed as shown, any liquid or solid matter entering the trap B must, when it once reaches the top of the seal-protector D, flow over and fall clear of the seal-protector D into the outlet C, and the flange *a*, which projects over the bottom side of the outlet C, not only increases the velocity of the flow of the water and solid matter through the trap B, by creating a fall from the said trap, but it is also so shaped that it effectually prevents any backwash through the outlet C into the trap B.

In Fig. 3 I show a vent-hole, E, immediately over the inlet-opening of the trap B, which permits the escape of the obnoxious gases from the trap, and I also show a hand-hole, F, immediately over the seal-protector D, which location of the latter enables both the trap B and the outlet C to be examined and readily cleaned of any obstruction which might accidentally accumulate therein. It will of course be understood that the hand-hole F is provided with a suitable hermetically-sealed cover.

What I claim as my invention is—

The U-shaped trap B, having inlet A and outlet C, the level of the seal of the said trap being below the bottom of the inlet and above the top of the outlet, combined with an angular seal-protector, D, formed at the junction of the upwardly-inclined side of the trap with the outlet-pipe above the top of said outlet and having a lip, *a*, projecting into the outlet and curved upon its under side, substantially as shown, and for the purposes specified.

Toronto, December 9, 1886.

JOHN MAGUIRE.

In presence of—
 CHARLES C. BALDWIN,
 CHARLES A. RICHES.